May 2, 1933.  A. SCHMIDT  1,907,398
IRONING AND STEAMING DEVICE
Filed Oct. 19, 1929  3 Sheets-Sheet 1
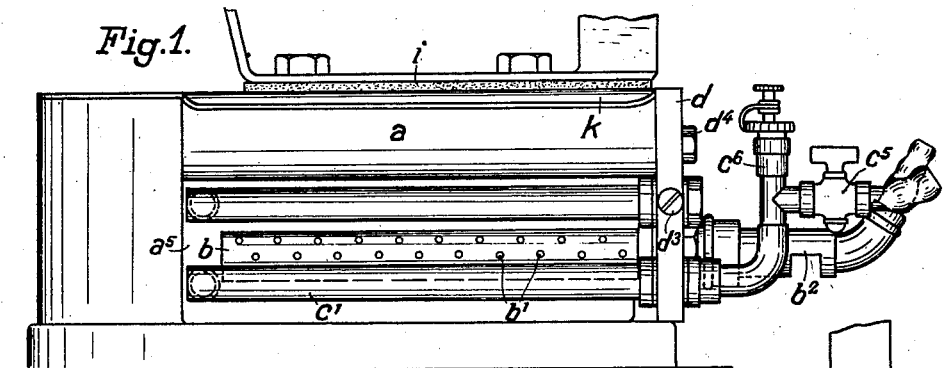
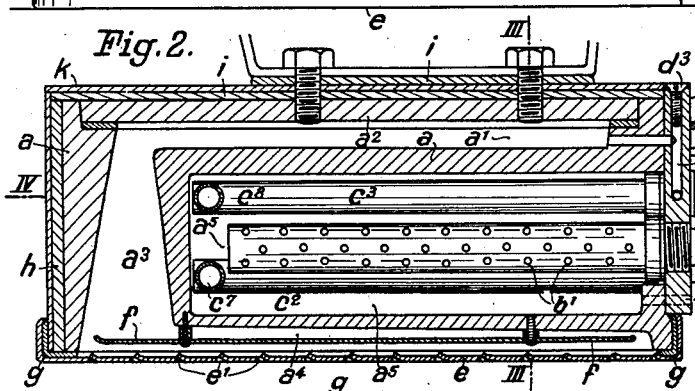
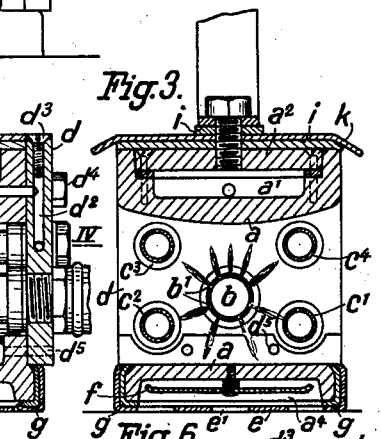
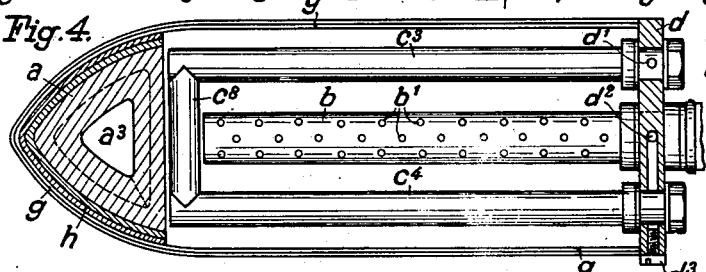
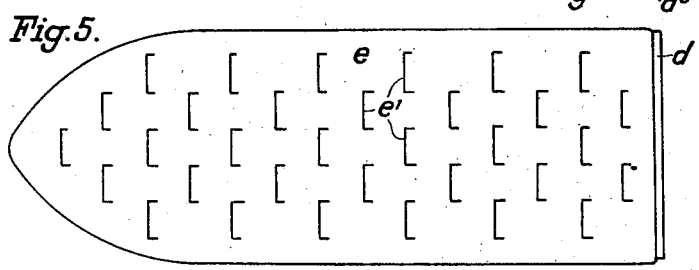
Inventor:
Alexander Schmidt

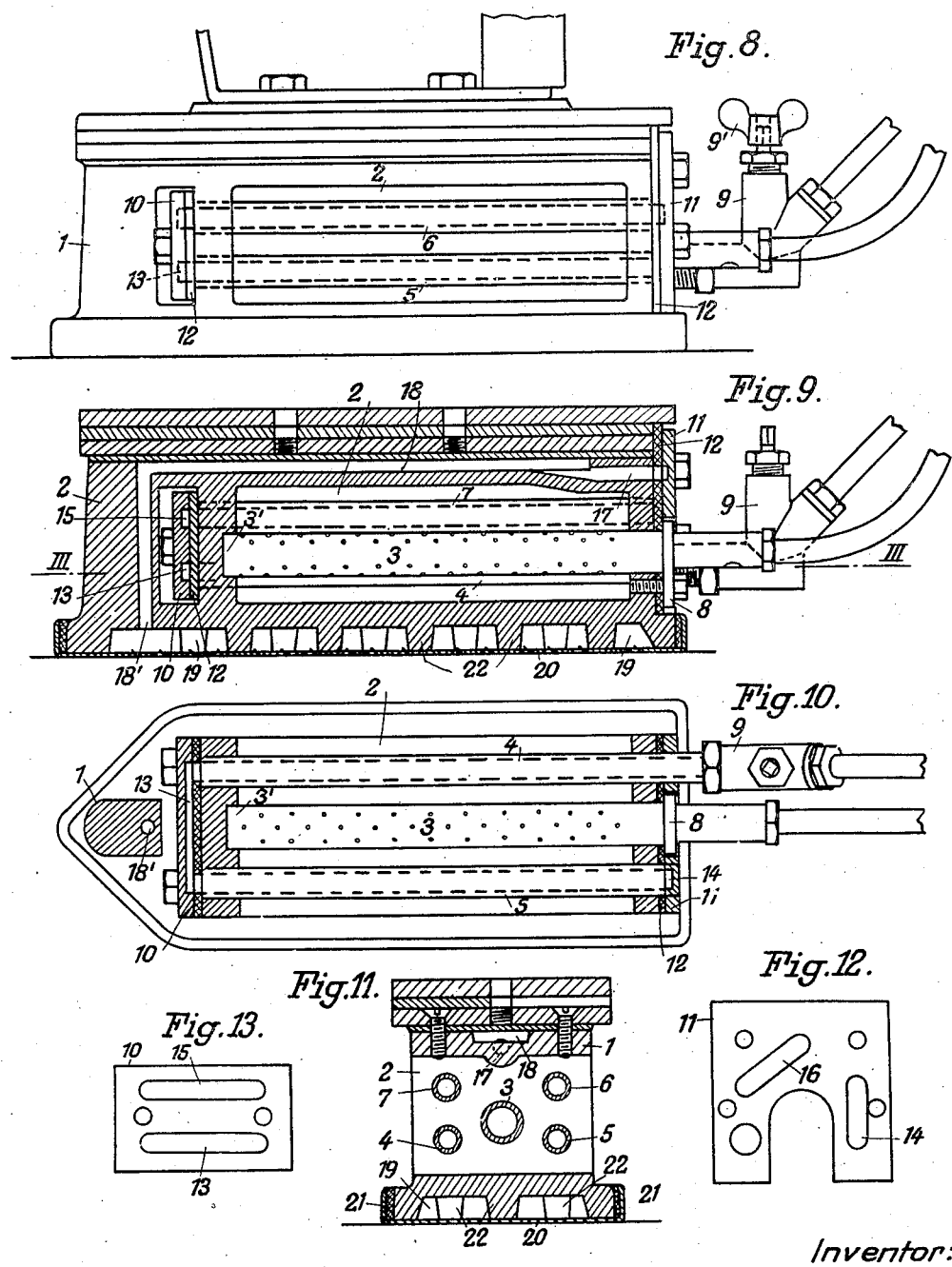

May 2, 1933.                A. SCHMIDT                1,907,398
                      IRONING AND STEAMING DEVICE
                  Filed Oct. 19, 1929        3 Sheets-Sheet 3

Inventor:
Alexander Schmidt

Patented May 2, 1933

1,907,398

UNITED STATES PATENT OFFICE

ALEXANDER SCHMIDT, OF BERLIN, GERMANY

IRONING AND STEAMING DEVICE

Application filed October 19, 1929, Serial No. 400,934, and in Germany October 18, 1928.

I have filed an application in Germany on October 18, 1928.

My invention relates to a tailor's iron, more especially to a hot pressing and steaming iron, for use by hand. Many types of hand steaming and hot pressing irons are known, but they suffer from various drawbacks, such as singeing of the cloth and formation of water spots.

The principal object of my invention is to provide an iron, which will avoid these said drawbacks by producing a perfectly dry steam by means of a special and very ingenious arrangement of a heating burner distributing the heat allround and in different modes of application and by using a tube steam generator and superheater.

The advantage hereby obtained as compared to other steaming and pressing irons resides in the use for all clothes, even for leather, which can be ironed on its right hand side without shrinking, the stuffs being treated directly without the use of wet clothes between iron and the cloth to be ironed.

In the drawings accompanying this specification and forming part of the application, I have illustrated the object of my invention by way of example, and the hand steaming and pressing iron is shown in two modifications, one being for heating with gas, the other for heating by electricity.

In the drawings

Fig. 1 is a side elevation,

Fig. 2 is a longitudinal section,

Fig. 3 is a cross-section on line III—III of Fig. 2,

Fig. 4 is a horizontal section on line IV—IV of Fig. 2,

Fig. 5 is a plan view of the bottom plate from below,

Fig. 6 is a back view,

Fig. 7 is a part of a section of a special modification,

Fig. 8 is a side elevation of the second modification,

Fig. 9 is a longitudinal section,

Fig. 10 is a horizontal section on line III—III of Fig. 9,

Fig. 11 is a vertical cross section,

Fig. 12 illustrates a baffle plate,

Fig. 13 shows a second baffle plate of a gas heated iron,

Figure 14:
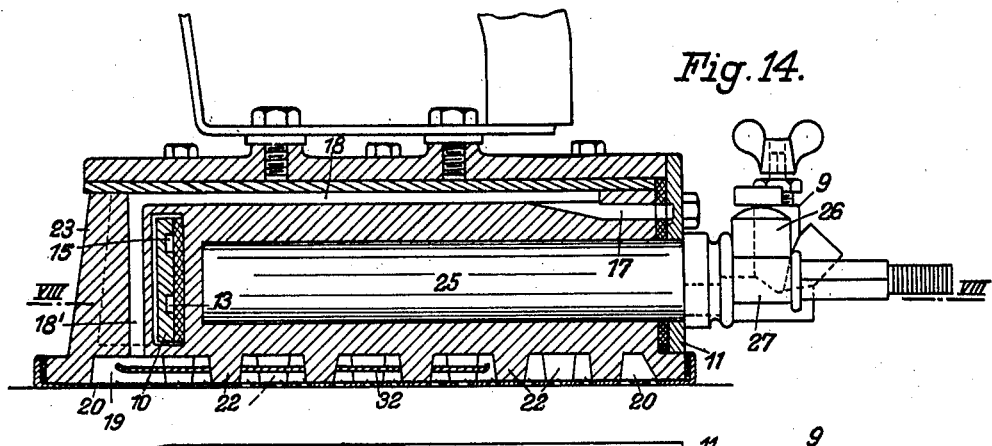
Fig. 14 is a longitudinal section of still another form of my invention.
Figure 15:
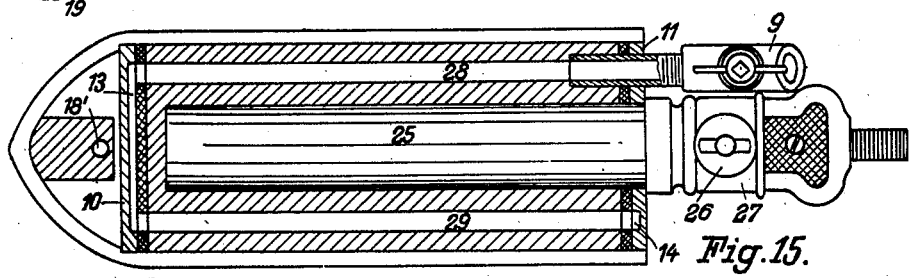
Fig. 15 is a horizontal section on line VIII—VIII of Fig. 14.
Figure 16:
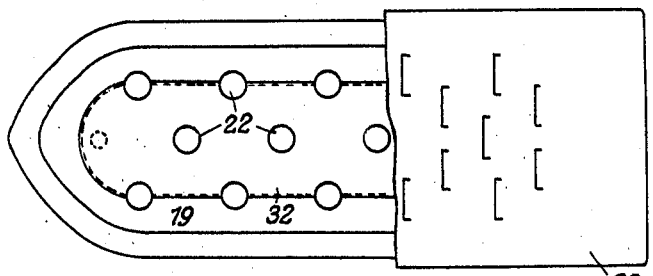
Fig. 16 is a view from below, partly broken away.
Figure 19:
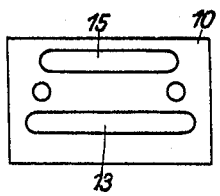
Fig. 19 is a second baffle plate for a steaming iron with heating by means of electricity.

In the modifications of my invention disclosed by the drawings, irons are shown consisting of a body $a$ of a light metal, non-rusting alloy or sprayed cast-iron, said body $a$ having an open space $a'$ and a plate $a^2$ covering said open space, a further open space of wedge shape $a^3$ and a further open space at the bottom $a^4$. The space $a^5$ of the said body serves for accommodating the burner $b$ the flame borings $b'$ of which being arranged so that the parts described below will be properly heated.

Arranged in space $a^5$ is also the steam producing system consisting of four or more longitudinal tubes $c'$—$c^4$. These tubes and the burner $b$ are fixed to a closing plate $d$ in such a manner, that burner $b$ and steam tubes $c'$—$c^4$ may be inserted together into the space $a^5$. The water required for producing the steam, preferably distilled water, is supplied to the steam generating tubes through the stop cock $c^5$ and regulating nozzle $c^6$, it being of no importance into which of the tubes the water flows first. In the illustrated example disclosed, the water flows into the steam tube $c'$, through tube connection $c^7$ into the tube $c^2$.

From the tube $c^2$ the water and steam passes up through a channel $d^1$ in the plate $d$ into a tube $c^3$ which feeds the fluid through a tube connection $c^8$ into the tube $c^4$. From the latter the fluid passes through a channel $d^2$ into the space $a^1$ whence it flows; $a^3$ and $a^4$ to the bottom plate $e$. Tubes $c'$—$c^4$ are fixed to plate $d$ by means of screw caps.

The channels $d'$ and $d^2$ in plate $d$ are closed by screws $d^3$ and can be easily cleaned after the removal of said screws. The plate $d$ is connected to body a by means of screws $d^4$ and pins $d^5$.

The bottom plate e is provided with steam outlet slots $e^1$ (Figs. 2, 3 and 5) through which the steam is emitted in finely distributed oblique jets, so that the cloth will be properly steamed.

The bottom plate e is provided with a raised rim whereby it engages over the lower edge of the iron, a packing g of insulating material being interposed between the iron and the plate rim.

For the treatment of delicate materials, a cloth l may be applied to the bottom of the iron as shown in Fig. 7. A perforated asbestos layer m may be interposed between the plate e and the cloth to protect the latter from the heat. The cloth and the asbestos may be attached to a flanged metal frame adapted to engage over the rim of the plate e, as shown in Fig. 7, so as to retain itself in position by friction.

In space $a^4$ above the bottom plate e a plate f is preferably arranged as a shield for preventing singeing of the cloth by excessive radiated heat.

At the front section of the pressing and steaming iron insulations h are arranged, and there are also insulations i below the handle, so that the heat will be retained at all points. The projecting covering plate k extends over the sides and is preferably made of a sheet-packing or similar insulating material.

As shown in Fig. 8—13, the hand steaming and pressing iron consists of a body 1 perforated for the reception of the gas heating burner 3 and the steam generating tubes 4, 5, 6, and 7, the aperture being denoted 2. The burner 3 is fixed by means of a plate 8 attached to the body 1. The tubes 4—7 are passed at their ends into the body 1 and are fixed there by expansion. The water is admitted through a regulating cock 9 provided with a detachable winged key 9′.

The single tubes are connected by means of the baffle plate 10 for the front part and by plate 11 for the back part of the iron, said plates being jointed by means of jointing sheets 12. The water passed into the iron through cock 9 for the generation of steam flows through tube 4 and passes thence through the channel 13 of the end plate 10 into tube 5. The generated steam and the water residue pass through a rising channel 14 in the end plate 11 into tube 6. The steam now flows through channel 15 in the end plate 10 and passes through tube 7, the channel 16 in plate 11 and boring 17 in body 1 into the superheating chamber 18. Here the steam is dried and then led through a boring 18′ into the steam outlet chamber 19 and through the apertured bottom plate 20 into the cloth to be ironed. The bottom plate 20 has a raised rim whereby it engages the edge of the iron over an insulation 21 and is prevented from bending inwards by means of lugs 22 projecting from the body 1.

The hand pressing and steaming iron for electrical heating as shown in Fig. 14—19 comprises a body 23 with a boring 24 into which a heating element 25 has been introduced. Said element 25 is advantageously provided with a multiple contact switch 26 at the contact device 27. The other arrangements and devices in this iron are identical with those described above, but instead of tubes 4—7 borings in body 23 are provided.

The water passing through the regulating cock 9 flows through boring 28, channel 13 of plate 10 and into the boring 29 of the body 23. The steam now rises through channel 14 of plate 11 in to the boring 30. After passing through boring 30 and channel 15 of plate 10, the steam flows into boring 31 and through the rising channel 16 in plate 11 into the boring 17 and superheater 18 of body 23. Here a further boring 18′ is provided together with a steam outlet chamber 19 with the bottom plate 20 and pin shaped lugs 22, which serve as spacers between the bottom plate and the perforated plate.

Figure 17:
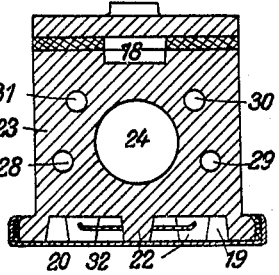
Fig. 17 is a vertical cross section.
Figure 18:
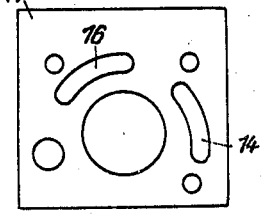
Fig. 18 is a baffle plate.

In order to prevent the condensate from passing out, a protecting plate 32 may be provided between the spacing lugs 22 (Fig. 17).

The steam and also the electrically heated irons may be insulated from the handle to prevent the latter from getting excessively hot.

It is of advantage to bend upwards one end of the slit wall in the slotted plate so that the slits will not spoil the cloth. Also the baffle or end plate of the iron and front section of the iron may be insulated in order to better retain the heat in the iron.

The steam generating tubes and the gas burner are fixed to a common plate which is suitably bored so as to form a connection between the water and steam tubes.

I claim:

1. A hand steaming and pressing iron of the character described, comprising an elongated body having a perforated bottom and a steam outlet chamber covered by said bottom, a steam superheating chamber communicating with said steam outlet chamber, a longitudinally arranged, perforated burner pipe in said body, and a plurality of parallel steam and water tubes connected in series and grouped about said burner pipe, the first of said tubes adapted to be connected to a water supply, and the last of said tubes being connected to said superheating chamber.

2. The structure claimed in claim 1 in combination with plates holding the ends of the tubes and formed with channels through which the tubes communicate with one another.

3. The structure claimed in claim 1 in combination with a shield arranged in the steam outlet chamber above the bottom.

4. A structure as claimed in claim 1 wherein the body is formed with depending lugs forming supports for the bottom.

In testimony whereof I affix my signature.

ALEXANDER SCHMIDT.